US012156299B2

(12) United States Patent
Bellinger et al.

(10) Patent No.: US 12,156,299 B2
(45) **Date of Patent: *Nov. 26, 2024**

(54) ELECTRONIC VAPORIZER HAVING REDUCED PARTICLE SIZE

(71) Applicant: EVOLV, LLC, Ashtabula, OH (US)

(72) Inventors: John Bellinger, Cuyahoga Falls, OH (US); Brandon Ward, Ashtabula, OH (US)

(73) Assignee: EVOLV, LLC, Ashtabula, OH (US)

( * ) Notice: Subject to any disclaimer, the term of this patent is extended or adjusted under 35 U.S.C. 154(b) by 667 days.

This patent is subject to a terminal disclaimer.

(21) Appl. No.: 16/524,459

(22) Filed: Jul. 29, 2019

(65) Prior Publication Data

US 2019/0343187 A1 Nov. 14, 2019

Related U.S. Application Data

(63) Continuation of application No. 14/736,002, filed on Jun. 10, 2015, now Pat. No. 10,362,803.

(51) Int. Cl.
*H05B 1/02* (2006.01)
*A24F 40/10* (2020.01)
(Continued)

(52) U.S. Cl.
CPC ........... *H05B 1/0227* (2013.01); *A24F 40/46* (2020.01); *A24F 40/53* (2020.01); *A24F 40/10* (2020.01)

(58) Field of Classification Search
CPC . B29B 2911/14593; B29B 2911/14653; B29B 2911/14713; B29C 2045/7228; B29C 2045/725; B29C 45/4225; B29C 45/7207; B29C 49/06; B29C 49/6427; B29C 45/045; B29K 2067/00; B29K 2105/258; C08L 5/08
(Continued)

(56) References Cited

U.S. PATENT DOCUMENTS

| | | | |
|---|---|---|---|
| 2,057,353 | A | 10/1936 | Whittemore, Jr. |
| 3,934,117 | A | 1/1976 | Schladitz |

(Continued)

FOREIGN PATENT DOCUMENTS

| | | | |
|---|---|---|---|
| CN | 200420031182.0 | A2 | 8/2005 |
| EP | 0 358 114 | A2 | 8/1989 |

(Continued)

OTHER PUBLICATIONS

International Preliminary Report on Patentability with associated International Patent Appln No. PCT/US2015/035154 dated Dec. 21, 2017.

(Continued)

*Primary Examiner* — Vy T Nguyen
(74) *Attorney, Agent, or Firm* — Tucker Ellis LLP

(57) ABSTRACT

A two-stage atomizer having a primary heating element and a secondary heating element. The primary heating element heats a fluid to generate an aerosol with a given average particle size. The secondary heating element reheats the aerosol from the first heating element to produce a final aerosol having a reduced average particle size. The two-stage atomizer is configured to operate with an electronic vaporizer device having a power source and control electronics.

17 Claims, 7 Drawing Sheets

(51) Int. Cl.
*A24F 40/46* (2020.01)
*A24F 40/53* (2020.01)

(58) Field of Classification Search
USPC .................. 392/404; 131/273, 329; 709/203
See application file for complete search history.

(56) References Cited

U.S. PATENT DOCUMENTS

| | | | | |
|---|---|---|---|---|
| 5,117,482 | A | 5/1992 | Hauber | |
| 6,043,471 | A | 3/2000 | Wiseman et al. | |
| 6,393,233 | B1 | 5/2002 | Soulier | |
| 6,557,552 | B1 | 5/2003 | Cox et al. | |
| 6,681,998 | B2 | 1/2004 | Sharpe et al. | |
| 9,132,248 | B2 | 9/2015 | Qiu | |
| 9,301,547 | B2 * | 4/2016 | Liu | A24F 40/485 |
| 2006/0081616 | A1 | 4/2006 | Schuler | |
| 2010/0006565 | A1 | 1/2010 | Ben-Shmuel et al. | |
| 2010/0212679 | A1 | 8/2010 | Bishara | |
| 2011/0210105 | A1 | 9/2011 | Romashko et al. | |
| 2011/0265806 | A1 | 11/2011 | Alarcon et al. | |
| 2012/0174914 | A1 | 7/2012 | Pirshafiey et al. | |
| 2012/0199663 | A1 | 8/2012 | Qiu | |
| 2013/0032159 | A1 | 2/2013 | Capuano | |
| 2013/0192623 | A1 | 8/2013 | Tucker | |
| 2013/0340775 | A1 | 12/2013 | Juster | |
| 2014/0190477 | A1 | 7/2014 | Qiu | |
| 2014/0190496 | A1 | 7/2014 | Wensley et al. | |
| 2014/0332016 | A1 | 11/2014 | Bellinger | |
| 2014/0338680 | A1 | 11/2014 | Abramov et al. | |
| 2015/0059787 | A1 | 3/2015 | Qiu | |
| 2015/0173124 | A1 | 6/2015 | QIu | |
| 2016/0174611 | A1 * | 6/2016 | Monsees | A24F 40/50 392/386 |
| 2018/0103685 | A1 * | 4/2018 | Yener | A24F 40/46 |

FOREIGN PATENT DOCUMENTS

| | | | |
|---|---|---|---|
| EP | 0 430 559 | A2 | 6/1991 |
| EP | 0 703 735 | B1 | 4/1996 |
| EP | 0 845 220 | A1 | 9/1997 |
| EP | 1618803 | A1 | 1/2006 |
| EP | 1736065 | A1 | 12/2006 |
| EP | 2022349 | B1 | 2/2009 |
| EP | 2 113 178 | A1 | 11/2009 |
| EP | 2 327 318 | A1 | 6/2011 |
| EP | 3085257 | A1 | 10/2016 |
| WO | 2007/131449 | A1 | 11/2007 |
| WO | 2014/187770 | A2 | 11/2014 |

OTHER PUBLICATIONS

International Search Report dated Mar. 7, 2016 for PCT/US2015/035154.

* cited by examiner

ELECTRONIC VAPORIZER HAVING REDUCED PARTICLE SIZE

BACKGROUND

Field of the Invention

This application relates generally to an electronic vaporizer or electronic cigarette and, more specifically, to control structures, heating elements, and other components thereof.

Description of Related Art

Electronic vaporizers (also referred to herein as electronic cigarettes or e-cigarettes) typically includes a power source, control electronics, a heating element, a container for a fluid, and a mouthpiece for inhalation. The control electronics can activate the heating element to vaporize the fluid, which can be inhaled via the mouthpiece. Moreover, in some instances, the control electronics can regulate the power supplied to the heating element from the power source. For example, the control electronics can output a set voltage, a set current, etc. to the heating element.

SUMMARY

In an embodiment, a two-stage atomizer for an electronic vaporizer device is described. The two-stage atomizer includes a primary heating element and a secondary heating element. The primary heating element heats (e.g., boils) a fluid to generate an aerosol. The aerosol has an average temperature functionally dependent on at least the power delivered to the heater coil and a boiling point of the fluid, and a particle size measured according to a primary dimension (e.g., mass, diameter, etc.). The aerosol is conveyed to the secondary heating element for additional heating and/or boiling to generate a finer aerosol. The finer aerosol includes particles having a reduced size along the primary dimension.

This and other embodiments are described in more detail below.

BRIEF DESCRIPTION OF THE DRAWING

Various non-limiting embodiments are further described with reference the accompanying drawings in which.

DETAILED DESCRIPTION

Figure 1:
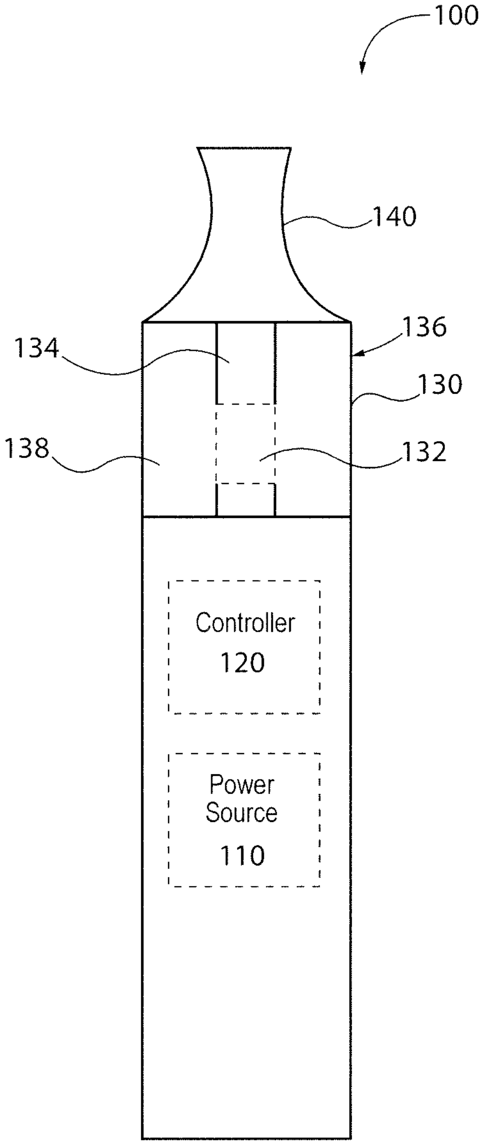
FIG. 1 is a schematic block diagram of an exemplary, non-limiting embodiment of an electronic vaporizer according to one or more aspects.

With reference to the drawings, the above noted features and embodiments are described in greater detail. Like reference numerals are used to refer to like elements throughout.

Turning to FIG. 1, illustrated is a schematic block diagram of an exemplary, non-limiting embodiment of an electronic vaporizer 100. As shown, the electronic vaporizer 100 can include a power source 110, a controller 120, an atomizer 130, and a mouthpiece 140. The atomizer 130 can include a first heating element 132 generally positioned within an air channel 134 leading to the mouthpiece 140. Further, the first heating element 132 can be in fluid communication with a fluid 138 held in a chamber, tank or other container 136. As discussed in greater detail below, a wicking material or other delivery mechanism can be employed to convey fluid 138 from the container 136 to a location proximate to the first heating element 132. Fluid 138, which is deposited near or in contact with the first heating element 132, boils and transitions to a vapor when the first heating element 132 is heated via electrical power provided by power source 110 and regulated by controller 120. The vapor, once generated, can be drawn up the air channel 134 by an air flow created by a user via the mouthpiece 140. While referred to herein as a vapor, it is to be appreciated that, in some embodiments, the output of the electronic vaporizer 100 is an aerosol mist form of fluid 138.

One parameter or characteristic on which user experience with the electronic vaporizer 100 is based includes an amount or quantity of vapor generated. This parameter generally corresponds to a power input (e.g., wattage) to the heating element 132. The controller 120 can ensure a substantially consistent and uniform vapor production and, therefore, consistent user experience, by regulating the power input from power source 110 to the first heating element 132 to maintain a preset level. The preset level can be established by the user via input means (not shown) of the electronic vaporizer 100 such as buttons, switches, etc. The preset level can also be displayed on a display screen (not shown) of the electronic vaporizer 100. By way of example and not limitation, controller 120 can measure at least two of the following: a resistance of the first heating element 132, a voltage applied to the first heating element 132, or a current supplied to the first heating element 132. From these measures, the controller 120 can determine an actual power output of the first heating element 132 and adjust one of a voltage or current provided by power source 110 to maintain the power output to the preset level. However, it is to be appreciated that other control, measurement, and/or feedback schemes can be utilized provided such schemes result in a substantially constant power output to the first heating element 132.

Another parameter or characteristic influencing the user experience is a quality of the vapor (e.g., taste, feeling, etc.). This parameter generally correlates to a temperature of the first heating element 132. Fluid 138 can be a mixture of propylene glycol, glycerin, water, nicotine, and flavorings. At a high temperature, these compounds can degrade into less flavorful materials, or potentially harmful substances. Accordingly, the controller 120 can determine the temperature of the first heating element 132 and control the power source 110 to prevent the temperature of the first heating element 132 from exceeding a set temperature. As with the preset power level described above, the set temperature is configurable by the user.

In one example, temperature control can be implemented by utilizing a heating element comprising a material with a known, positive temperature coefficient of resistance. The controller 120, by measuring a relative change in resistance of the first heating element 132, can determine a relative change in temperature. By establishing a reference resistance, e.g., an absolute resistance of the heating element at a known temperature, the controller 120 can determine an average temperature of the first heating element 132 based on a measured resistance. When the determined temperature meets or exceeds the set temperature, the controller 120 limits a power output to prevent a further increase in temperature.

Still further, with fluid 138 containing nicotine, similar to how the quantity of vapor generated correlates with power output of heating element 132, dosing may also correlate to the power output. The energy imparted to fluid 138 via the power output of the heating element 132 generates a vapor, which condenses to an aerosol upon entry into an airstream thereby transferring some of that energy to the airstream. In other words, the aerosol cools slightly. As stated above, a user experience (e.g., taste, feeling, etc.) associated with the aerosol relates to temperature of the aerosol. To generate a hotter aerosol, more power is delivered to the fluid 138. However, with increased power comes increased vapor productions, which results in a larger does of nicotine.

Yet another characteristic of user experience is an effect of the vapor (e.g., a physiological or psychological effect, a health effect, etc.). For instance, with fluid 138 containing nicotine, this characteristic can be a rate of absorption and/or an amount of absorption. Moreover, this characteristic can relate to externalities of the vapor imposed on others in an environment. In either case, a property of the vapor relating to this characteristic is particle size.

Figure 2A:
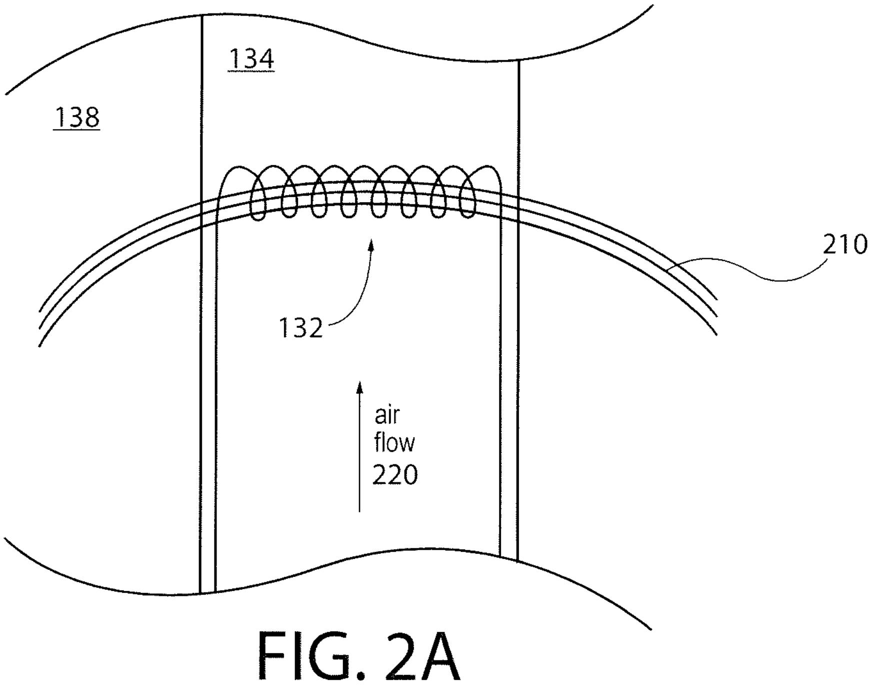
FIG. 2A is a schematic diagram of an exemplary, non-limiting heating element according to one or more aspects.
Figure 2B:
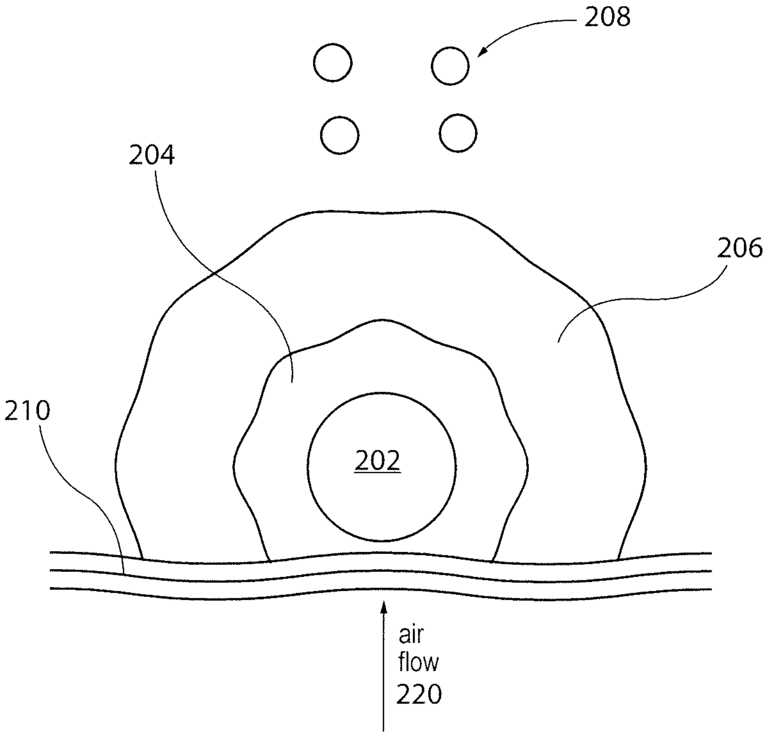
FIG. 2B is a cross-sectional, schematic diagram of a wire of the heating element of FIG. 2A.

Turning briefly to FIGS. 2A and 2B, a schematic diagram of an exemplary, non-limiting embodiment of first heating device 132 is illustrated. As shown in FIG. 2A, the first heating device 132 can be a heating coil at least partially positioned within the air channel 134. A wicking material 210, being in fluid communication with fluid 138, conveys fluid 138 to the first heating device 132, where the fluid 138 can be vaporized (more specifically, aerosolized). FIG. 2B depicts a cross-sectional view of a wire 202 of the first heating device 132. The wicking material 210 deposits a liquid phase layer 206 of fluid 138 around the wire 202. Due to the current carried by the wire 202, a portion of the liquid phase layer 206 is heated to a boiling point and transitions to a vapor, thereby creating a vapor phase layer 204. In response to air flow 220 through air channel 134, vapor in the vapor phase layer 204 is carried away from the wire 202. However, as the vapor phase layer 204 is substantially surrounded by the liquid phase layer 206, the vapor particles condense, cool, and increase in size. After transiting across the liquid phase layer 206, the vapor condenses to aerosol particles 208 having a larger particle size than the vapor particles of the vapor phase layer 204.

Figure 3:
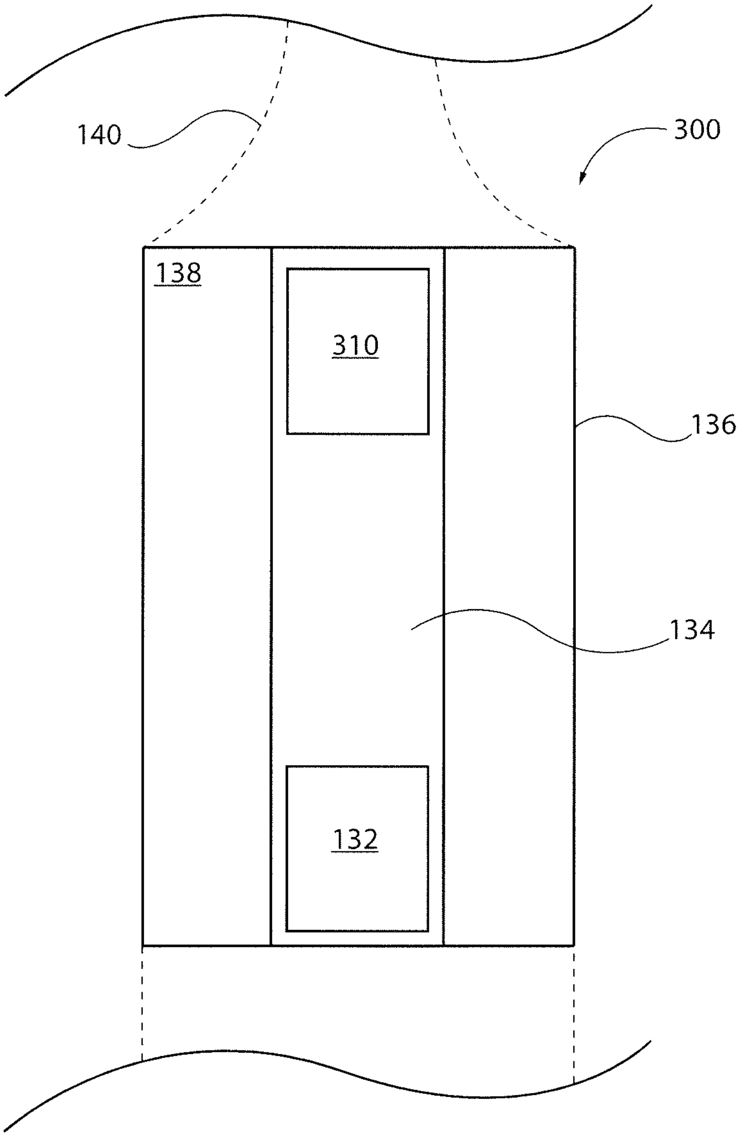
FIG. 3 is a schematic block diagram of an exemplary, non-limiting atomizer according to one or more aspects.

FIG. 3 illustrates a schematic block diagram of an exemplary, non-limiting embodiment of an atomizer 300 configured to reduce the size of aerosol particles 208 produced by the first heating element 132. According to an aspect, vapor/particle size is reduced with a two-stage heating structure. As shown, atomizer 300 includes a second heating element 310 at least partially disposed within the air channel 134. The second heating element 310 reheats or applies additional heat to the aerosol particles 208 carried by air flow 220 from the first heating element 132 to produce vapor and smaller aerosol particles. Effectively, second heating element 310 super-heats a saturated low-quality vapor within the air flow 220. This vapor and smaller aerosol particles are carried out through the mouthpiece 140 to be inhaled by the user.

Thus, in terms of two-stage heating, the first heating element 132 implements a first stage where liquid fluid is heated to a heat of vaporization or boiling point to produce liquid droplets carried by air flow 220. The second heating element 310 implements a second stage where the liquid droplets are heated again to produce vapor and/or fine droplets. According to an example, the second heating element 310 can be substantially similar to the first heating element 132. For instance, the second heating element 310 can be a heating coil substantially similar to the heating coil illustrated in FIGS. 2A and 2B. It is to be appreciated that the second heating element 310 is not associated with a wicking material since a heating target, i.e. the saturated vapor, for the second heating element 310 is conveyed to the heating coil by air flow 220.

As discussed above, the second heating element 310 facilitates output of a finer aerosol (e.g., an aerosol having a reduced particle size), which leads to improved absorption. However, the second heating element 310 also facilitates improving the quality of the vapor (e.g., taste, feel, etc.) by increasing a temperature of the output aerosol. Further still, the improved vapor quality can occur without a corresponding increase in dosing. Thus, atomizer 300 may be applicable for smoking cessation purposes. For instance, a traditional cigarette may deliver approximately between 20 and 30 watts to heat the air and smoke passing through. An atomizer providing less than this range generates an output (i.e. aerosol) cooler and weaker, in comparison, to a user. However, increasing the power output of the atomizer to produce an equivalent aerosol, from a user experience perspective, to a traditional cigarette would increase the dosing of nicotine.

The second heating element 310 adds more total energy to the aerosol without producing a larger quantity of vapor or aerosol. In other words, the amount of vapor produced is decoupled from the quality of the vapor. That is, the first heating element 132 controls an amount of vapor generated and the second heating element 310 controls the temperature of the vapor independently from the amount generated. With the second heating element 310, a satisfying user experience is achievable while consuming smaller amounts of fluid 138. Accordingly, from a cessation perspective, the dosing of nicotine can be reduced through use of atomizer 300 without sacrificing user experience or satisfaction.

In yet another aspect, the second heating element 310 can be controlled, via controller 120 for example, with similar techniques as the first heating element 132. For instance, the second heating element 310 can be temperature controlled and/or power (wattage) controlled by controller 120 via the techniques described above. A reference resistance for the second heating element 310 can be established. The reference resistance, in an example, can be a resistance of the second heating element 310 at a cold temperature relative to an operating temperature of the atomizer 300 such as, but not limited to, a resistance at room temperature. The second heating element 310 can have known resistance characteristics versus temperature. Accordingly, a relative change in measured resistance can be translated into a relative change in temperature. With the reference resistance, the controller 120 can determine an actual average temperature of the second heating element 310. By monitoring the average temperature of the second heating element 310, the controller 120 can limit temperature to prevent heating the vapor high enough to negatively impact taste, produce undesirable compounds, or to increase a temperature of mouthpiece 140 (or other parts of the electronic vaporizer 100).

Figure 4:
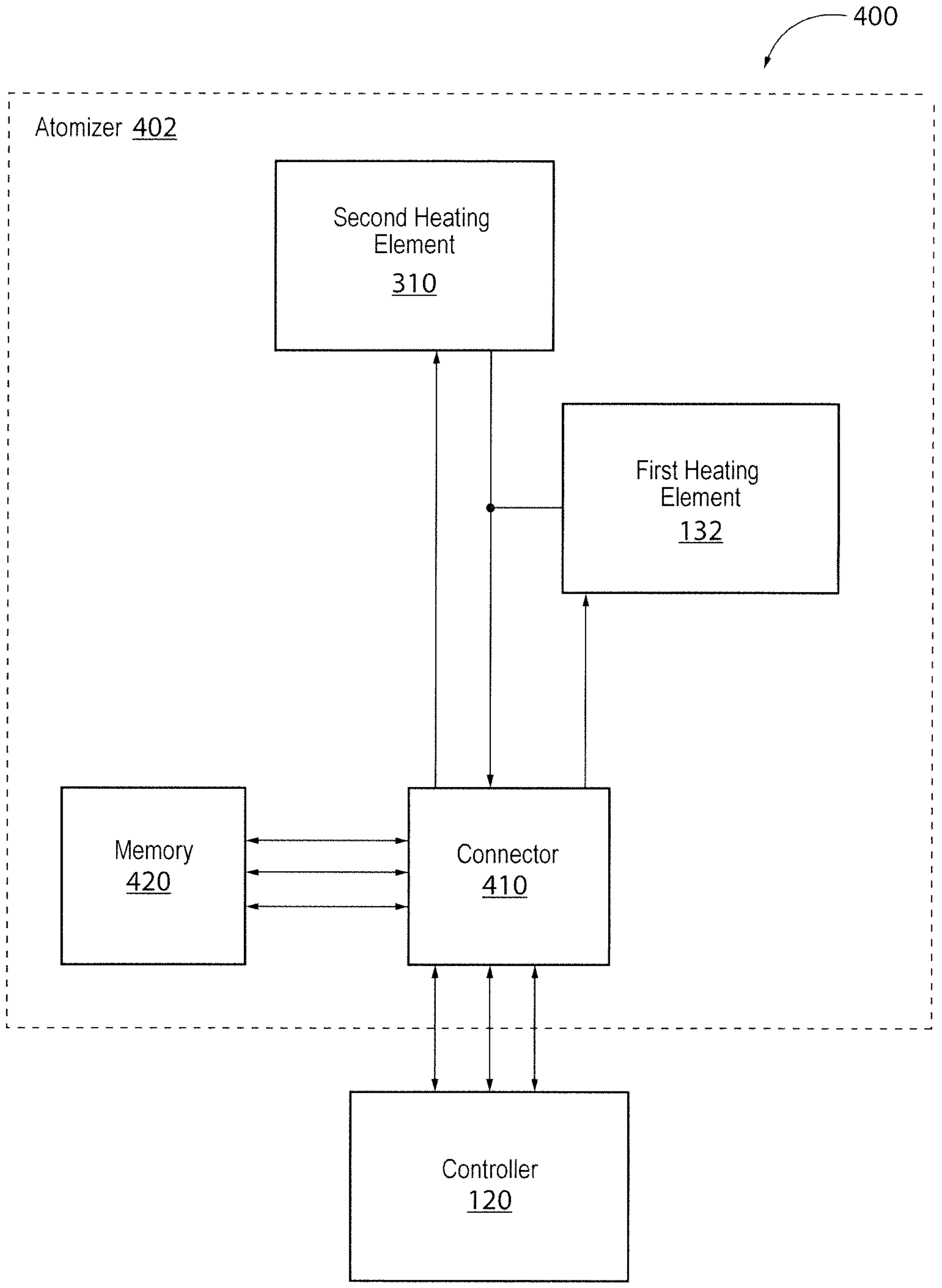
FIG. 4 is a schematic block diagram of an exemplary, non-limiting system for controlling an atomizer of an electronic vaporizer in accordance with one or more aspects.

Turning to FIG. 4, a schematic block diagram of an exemplary, non-limiting system 400 is illustrated. System 400 includes a portion of electronic vaporizer 100 and, specifically, includes an atomizer 402 and controller 120. As shown, atomizer 402 can be similar to atomizer 300 described above with having the first heating element 132 and the second heating element 310.

Atomizer 402 includes a connector 410 to facilitate removably coupling the atomizer 402 to other components of the electronic vaporizer 100 such as controller 120 and/or power source 110. According to one example, connector 410 can be at least a three-pin adapter such as, but not limited to, a coaxial connector having at least three conductor rings. It is to be appreciated that connector 410 can be other form factors and/or include more or less pins, conductors, communication paths, lines, etc. Pursuant to this example, a first pin can carry current or provide power to first heating element 132, a second pin can carry current or provide power to second heating element 310, and a third pin can be a return path or ground connection. The third pin can be shared by both the first heating element 132 and the second heating element 310.

These pins can also be utilized to communicate with a memory 420 included in the atomizer 402. Memory 402 can be an electrically erasable/programmable read-only memory (EEPROM); however, it is to be appreciated that memory 402 can be other forms of memory such as flash memory, other forms of ROM, or the like. Memory 402 can store a first reference resistance associated with the first heating element 132 and a second reference resistance associated with the second heating element 310. Further, memory 402 can include a user-space to store user-configurable settings such as, but not limited to, a power setting for the first heating element 132, a power setting for the second heating element 310, a temperature setting for the first heating element 132, a temperature setting for the second heating element 310, etc.

Memory 402 enables atomizer 402 to be pre-initialized or pre-configured for temperature control by storing reference resistances. In addition, memory 402 enables atomizer 402 to be swapped with another similar atomizer (e.g., containing a different fluid) and the controller 120 can read memory 402 to automatically configure power control, temperature control, etc. The references stored in memory may be stored based on the type of atomizer 402 including but not limited to the volume of the atomizer, liquid type, flavor or other characteristic such that customized or stored settings may be defined for a given atomizer 402. These settings may be based on defined settings from a manufacturer or based on custom settings stored through user input.

Figure 5:
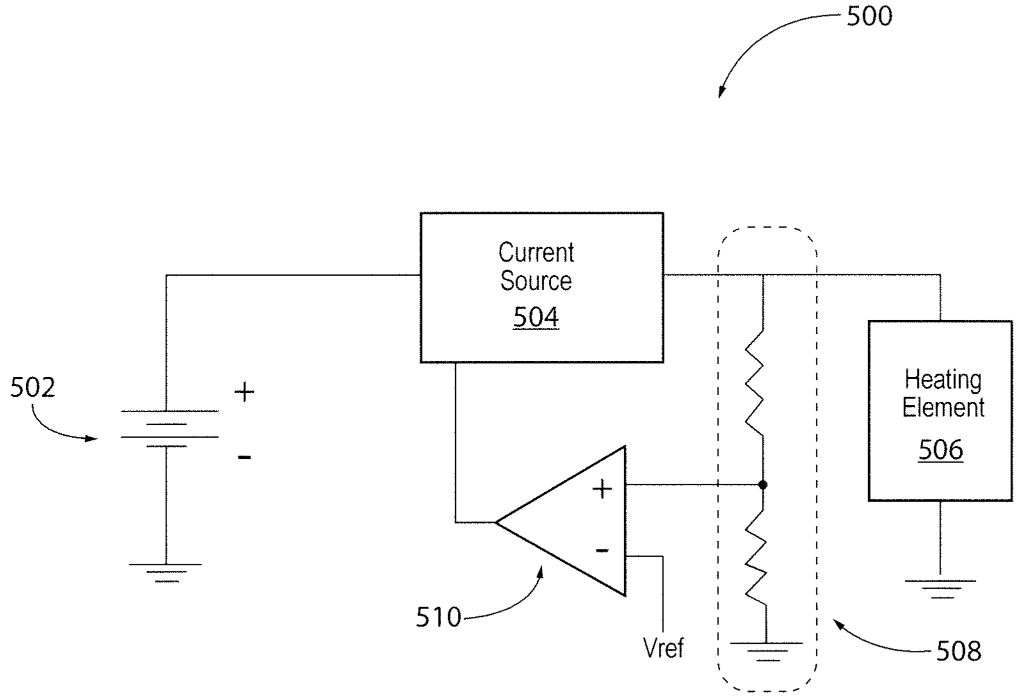
FIG. 5 is a schematic circuit diagram of an exemplary, non-limiting control circuit enforcing a temperature limit.

As previously described temperature control of the first heating element 132 or second heating element 310 is performed based on a measured resistance, known resistance/temperature characteristics, and a reference resistance at a predetermined temperature. Turning to FIG. 5, a control circuit 500 is illustrated that implements temperature control. Specifically, control circuit 500 prevents an average temperature of a heating element 506 from exceeding a predetermined temperature (e.g., a statutory limit or the like). Circuit 500 includes a power source 502 and a current source 504 which outputs a constant current to the heating element 506. As discussed above, resistance changes with temperature. Thus, the resistance of the heating element 506 increases as temperature increases. Since current source 504 outputs a constant current, the increase in resistance increases the output voltage to the heating element 506. With a heating element 506 having known resistance/temperature characteristics, a resistance at a threshold or maximum temperature can be determined. Further, with the constant current provided by the current source 504, this threshold resistance can be translated to a threshold or reference voltage. As shown in FIG. 5, circuit 500 includes a voltage sensor 508, which can be a voltage divider, for example, or substantially any component capable of outputting a measured output voltage. The voltage sensor 508 provides the measured output voltage to a comparator 510 for comparison to the reference voltage. When the output voltage exceeds the reference voltage (i.e., when the temperature of the heating element 506 exceeds the threshold), the comparator 510 provides a feedback signal to the current source 504 to reduce power and lower the temperature.

According to an aspect, current source 504 can be implemented with a switching regulator. Thus, the feedback signal can adjust a duty cycle of the switching regulator to limit temperature. Alternatively, the feedback signal can operate to shut off the current source 504 for a remainder of a period. The current source 504, the comparator 510, etc., reset for the next period and only shut off again if the comparator 510 trips.

Circuit 500 can be utilized in place of controller 120 to implement temperature control for the first heating element 132 and/or the second heating element 310. A cold resistance (e.g., a room temperature resistance, or the like) is determined for the first heating element 132 and/or the second heating element 310. With known resistance/temperature characteristics, a range of cold resistances can be associated with a range of hot temperatures around the threshold temperature. Specifically, with the reference voltage established in circuit 500, a threshold resistance is known. Based on the known resistance/temperature characteristics of the heating element material, this threshold resistance is correlated to a temperature based on the measured cold resistance. The first heating element 132 and/or second heating element 310 can be manufactured to a cold resistance that can increase to a temperature sufficient to operate the electronic vaporizer 100 without tripping the comparator 510. Further, the heating elements 132, 310 can be manufactured such to cold resistances that will not result in the threshold resistance at a temperature exceeding the threshold temperature.

Figure 6A:
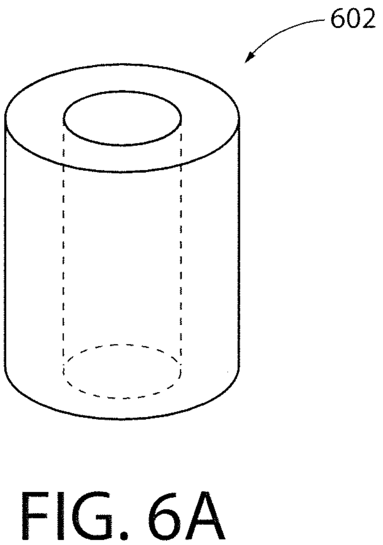
FIG. 6A is a perspective view of a fluid tank for an electronic vaporizer according to one aspect.
Figure 6B:
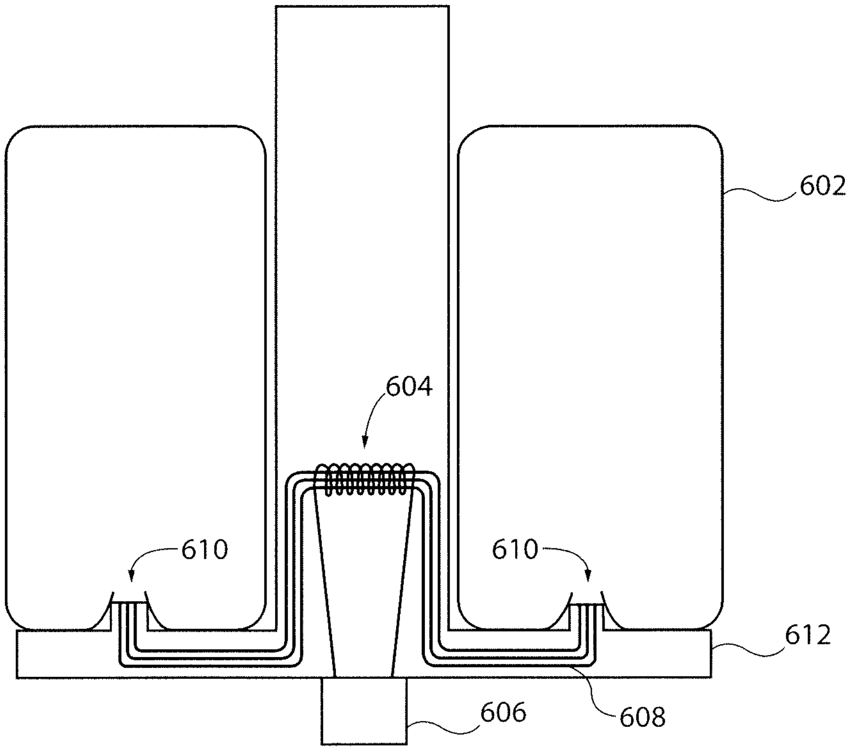
FIG. 6B is a cross-sectional view of the fluid tank of FIG. 6A mounted to an atomizer.

Turning to FIGS. 6A and 6B, an exemplary, non-limiting embodiment of a tank 602 for holding a fluid (e.g., fluid 138) is illustrated. As shown in FIG. 6A, tank 602 is a toroid having a hollow extending axially through the tank 602. As shown in cross-section illustration of FIG. 6B, tank 602 fits around a base 612 of an atomizer having a heating element 604 positioned in an air channel and a connector 606 for coupling the heating element 604 to a controller and/or power source. A wicking material 608 is provided to convey the fluid from tank 602 to the heating element 604.

A set of valves 610 are provided to bring the wicking material 608 into fluid communication with the contents of tank 602. According to one example, base 612 can include a set of protrusions to respective ends of the wicking material 608 are mounted. When the tank 602 is mounted to the base 612, the protrusions open features on tank 602 to enable the fluid to flow. When the tank 602 is removed, the protrusions retract and the features on tank 602 seal.

Figure 7A:
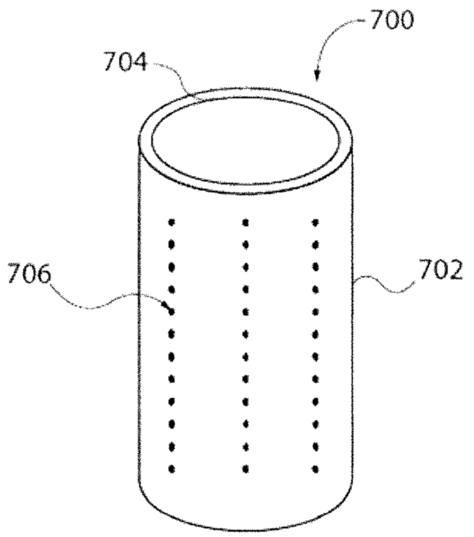
FIGS. 7A, 7B, and 7C illustrate an exemplary, non-limiting heating element that having wickless conveyance of fluid according to one or more aspects.

FIG. 7 illustrates an exemplary, non-limiting embodiment of a heating element 700 according to one or more aspects. As shown in FIG. 7A, heating element 700 is substantially cylindrical having an outer cylinder 702 and an inner cylinder 704. In an aspect, outer cylinder 702 is a thin foil having a plurality of apertures 706, which can be laser drilled to a diameter determined based on at least surface tension properties of fluid utilized with electronic vaporizers. The inner cylinder 704, according to an aspect, can be similar constructed; however, it is to be appreciated that inner cylinder 704 can be formed of a similar material as other heating elements described herein and/or conventionally used with electronic vaporizers.

Figure 7B:
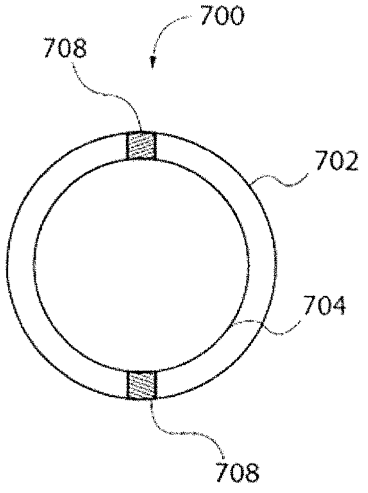
Figure 7C:
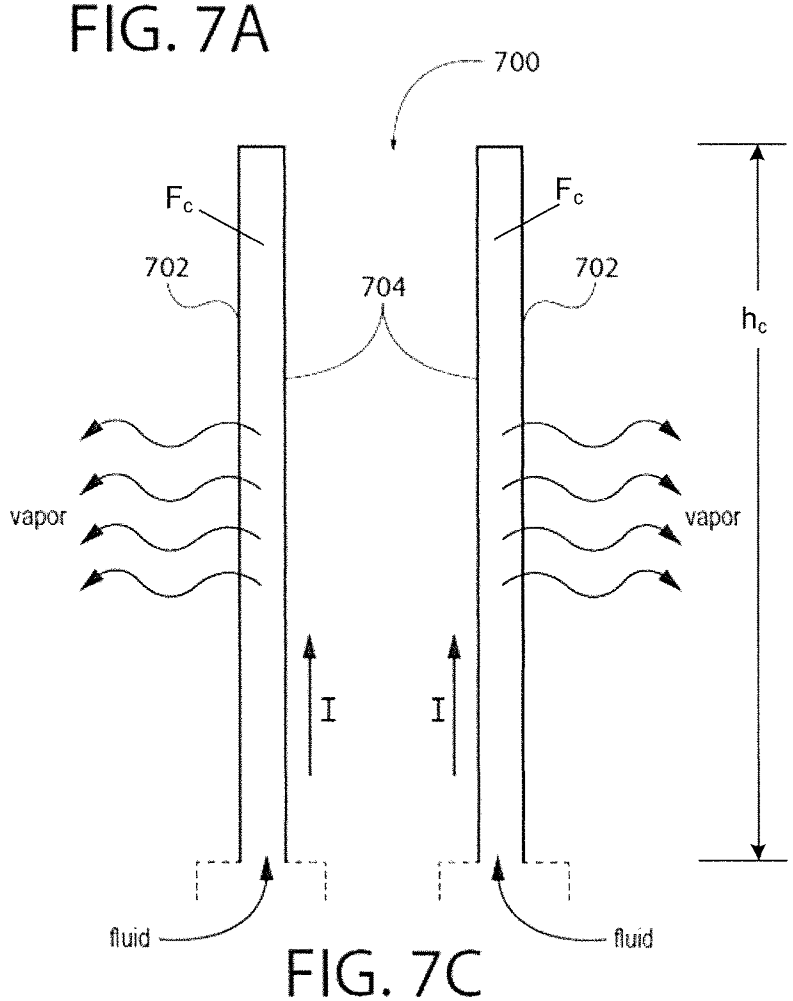

As shown in FIG. 7B, the outer cylinder 702 and inner cylinder 704 are maintained in a spaced relationship by spacers 708. The distance maintained between the outer cylinder 702 and the inner cylinder 704 is determined based on fluid properties and a minimum operating temperature of heating element 700. For instance, the distance is established by spacers 708 such that, as the temperature approaches the minimum operating temperature, the viscosity of the fluid decreases to enable the fluid to flow into a gap between the outer cylinder 702 and inner cylinder 704 by capillary action (see FIG. 7C). Further, the spacing established between the outer cylinder 702 and inner cylinder 704 may be configured such that a resultant capillary height, $h_c$, (e.g., a height of the fluid column, $F_c$, contained between the outer cylinder 702 and the inner cylinder 704) for a particular fluid is greater than, or at least equal to, a height of the atomizer (i.e., heating element 700). With this configuration, the heating coil can be self-feeding with fluid from a reservoir.

With fluid deposited in the gap, a current is carried by the inner cylinder 704 to generate heat to vaporize the fluid. The plurality of apertures 706 on the outer cylinder 702 render the outer cylinder 702 semi-permeable such that a vapor phase of the fluid can pass the barrier, but a liquid phase cannot. Thus, the vaporized fluid can pass through the outer cylinder 702 and into an air flow. The inner cylinder 704 and the outer cylinder 702 can be connected such that the current is carried into the heating element 700 via the inner cylinder 704 and carried out via the outer cylinder 702.

The heating element 700 can be utilized in connection with the removable tank 602 described above. For instance, instead of wicking material 608, the protrusions on the base 612 can open into channels connected heating element 700 and, specifically, the gap between the inner cylinder 704 and the outer cylinder 702.

According to another aspect, another wickless fluid delivery system can involve a pump (e.g., a peristaltic pump) that conveys fluid through tubing to a spray bar positioned relative to a heating plate. The spray bar applies the fluid to the heating plate for vaporization. For instance, the heated plate can be a curved plate having a half-moon or semi-circular cross-section. That is, the curved plate can be a half-cylinder or half-pipe. The spray bar can extend along an axis of the curved plate and direct fluid radial outward to the heating plate.

In one embodiment, a device is described herein. The device includes a first heating element for heating a fluid to produce a first aerosol having a first particle size. The device further includes a second heating element for heating the first aerosol to generate a second aerosol having a second particle size. In an example, a primary dimension of the second particle size is less than a primary dimension of the first particle size. In another example, at least one of the first heating coil or the second heating coil are replaceable portions of the device.

According to one example, the device is a two-stage atomizer removably coupleable to an electronic vaporizer device having a power source and control electronics. Further, the device can include a power source for providing electrical power to the first heating element and the second heating element and a control circuit for regulating the supply of electrical power to the first heating element and the second heating element. In addition, the device can include a connector for electrically coupling at least the first heating element and the second heating element to at least one of the power source or the control circuit.

The control circuit can include a processor-based controller configured to monitor a temperature of at least one of the first heating element or the second heating element and to regulate the temperature of the at least one of the first heating element or the second heating element. the control circuit regulates the temperature to prevent the temperature from exceeding a limit. In another example, the control circuit includes a constant current source and a voltage comparator, the voltage comparator interrupts the constant current source when a measured output voltage to at least one of the first heating element or the second heating element exceeds a predetermined threshold. The predetermined threshold can correspond to a resistance value associated with a temperature limit of the at least one of the first heating element or the second heating element.

In yet another example, the device can include a container for storing a fluid and means for conveying the fluid from the container to the first heating element. The container can be removably attached to the means for conveying.

Still further, the device can include a memory. In one example, the memory stores at least one of a first resistance reference associated with the first heating element or a second resistance reference associated with the second heating element, the first resistance reference and the second resistance reference respectively indicate a resistance of a respective heating element at a predetermined temperature. In another example, the memory stores at least one of a first temperature coefficient of resistance (TCR) curve associated with the first heating element, a first temperature-resistance transfer function associated with the first heating element, a second TCR curve associated with the second heating element, or a second temperature-resistance transfer function associated with the second heating element. Still further, the memory can store values for user-configurable parameters. The user-configurable parameters include one or more of a power setting for the first heating element, a power setting for the second heating element, a temperature limit for the first heating element, or a temperature limit for the second heating element.

In another embodiment, an atomizer for an electronic vaporizer is described. The atomizer includes a first heating element for heating a fluid to produce a vapor. The first heating element has a first controllable power output to generate a correspondingly controllable quantity of the vapor. The atomizer can further include a second heating element for heating the vapor, delivered via an airstream from the first heating element, to generate an output vapor. The second heating element has a second controllable power output to generate a correspondingly controllable temperature of the output vapor. In an example, the first controllable power output and the second controllable power output are independently controlled such that the quantity of the vapor is decoupled from the temperature of the output vapor.

In yet another embodiment, a method for an electronic vaporizer is described. The method can include controlling a first power output of a first heating element of an atomizer to generate a quantity of vapor from a fluid in contact with the first heating element. The method further includes controlling a second power output a second heating element, separated from the first heating element along an airstream, to increase a temperature of the quantity of vapor delivered to the second heating element via the airstream. The first power output and the second power output can be independently controlled.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As utilized herein, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated a myriad of additional or alternate examples of varying scope could have been presented, but have been omitted for purposes of brevity.

Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A device, comprising:

a two-stage atomizer, comprising:

a first heating element for heating a fluid to produce a first aerosol having a first particle size; and a second heating element downstream of the first heating element for heating the first aerosol to generate a second aerosol having a second particle size;

an electronic vaporizer device, comprising:

a power source for providing a supply of electrical power to the first heating element and a supply of electrical power to the second heating element; and a control circuit for regulating the supply of electrical power to the first heating element and the supply of electrical power to the second heating element, wherein the supply of electrical power to the second heating element is regulated independently from the supply of electrical power to the first heating element to increase a temperature of the first aerosol, the second heating element is regulated based on one or more relationships between a measured resistance of the second heating element during operation, and a known resistance of the second heating element at one or more specific temperatures, wherein a primary dimension of the second particle size is less than a primary dimension of the first particle size, and wherein the two-stage atomizer is removably coupleable to the electronic vaporizer device.

2. The device of claim 1, further comprising an air channel between the first heating element and the second heating element, wherein the air channel directs an air flow to carry the first aerosol to the second heating element.

3. The device claim 1, further comprising a connector for electrically coupling at least the first heating element and the second heating element to at least one of the power source or the control circuit.

4. The device of claim 1, wherein the control circuit comprises a processor-based controller configured to monitor a temperature of at least one of the first heating element or the second heating element and to regulate the temperature of the at least one of the first heating element or the second heating element.

5. The device of claim 4, wherein the control circuit regulates the temperature to prevent the temperature from exceeding a limit.

6. The device of claim 1, wherein the control circuit comprises a constant current source and a voltage comparator, the voltage comparator interrupts the constant current source when a measured output voltage to at least one of the first heating element or the second heating element exceeds a predetermined threshold.

7. The device of claim 6, wherein the predetermined threshold corresponds to a resistance value associated with a temperature limit of the at least one of the first heating element or the second heating element.

8. The device of claim 1, further comprising:

a container for storing a fluid; and means for conveying the fluid from the container to the first heating element.

9. The device of claim 8, wherein the container is removably attached to the means for conveying.

10. The device of claim 1, further comprising a memory.

11. The device of claim 10, wherein the memory stores at least one of a first resistance reference associated with the first heating element or a second resistance reference associated with the second heating element, the first resistance reference and the second resistance reference respectively indicate a resistance of a respective heating element at a predetermined temperature.

12. The device of claim 10, wherein the memory stores at least one of a first temperature coefficient of resistance (TCR) curve associated with the first heating element, a first temperature-resistance transfer function associated with the first heating element, a second TCR curve associated with the second heating element, or a second temperature-resistance transfer function associated with the second heating element.

13. The device of claim 10, wherein the memory stores values for user-configurable parameters.

14. The device of claim 13, wherein the user-configurable parameters comprise a power setting for the first heating element and a power setting for the second heating element, wherein the power setting of the second heating element is configurable independently from the power setting of the first heating element via at least one user input on the device.

15. The device of claim 1, wherein at least one of the first heating element or the second heating element are replaceable portions of the device.

16. The device of claim 14, wherein the power setting for the first heating element controls an amount of vapor generated by the device and the power setting for the second heating element controls a final temperature of the vapor generated by the device independently from the amount of vapor generated.

17. The device of claim 1, wherein the first heating element produces the first aerosol at a first temperature, and the second heating element produces the second aerosol at the second temperature, wherein the second temperature is greater than the first temperature.

* * * * *